United States Patent [19]

Skrentner

[11] 4,302,992
[45] Dec. 1, 1981

[54] PISTON TURNING MACHINE

[75] Inventor: Frank C. Skrentner, Fenton, Mich.

[73] Assignee: F. Jos. Lamb Company, Warren, Mich.

[21] Appl. No.: 113,054

[22] Filed: Jan. 17, 1980

[51] Int. Cl.³ .............................................. B23B 3/28
[52] U.S. Cl. ................................................... 82/19
[58] Field of Search ...................................... 82/19

[56] References Cited

U.S. PATENT DOCUMENTS

| 4,143,564 | 3/1979 | De Biasse | 82/19 |
| 4,210,040 | 7/1980 | Brown | 82/19 |

Primary Examiner—Harrison L. Hinson
Attorney, Agent, or Firm—Barnes, Kisselle, Raisch & Choate

[57] ABSTRACT

A lathe type piston turning machine wherein a single point cutting tool is controlled simultaneously by two separate cams to generate a desired contour on a piston which varies in both radial and axial cross section.

15 Claims, 3 Drawing Figures

PISTON TURNING MACHINE

This invention relates to a piston turning machine, and, more particularly, to a machine for turning pistons having an elliptical cross section which varies in size axially of the piston.

Pistons as used in modern day engines are normally at least slightly elliptical in cross section and vary in diameter from end to end. Some pistons are slightly tapered from one end to the other and other pistons are even slightly barrel-shaped in axial section. In manufacturing such pistons the present day practice is to provide a generally, but not exactly, cylindrical cam having the external shape which conforms to the desired outer contour of the piston in both axial and radial section. The cam so formed rotates with the piston in a lathe type machine having a single point tool arranged so that the external contour of the cam displaces a cam follower and, thus, dictates the contour of the machined surface on the piston. One arrangement of this general type is shown in my prior U.S. Pat. No. 3,983,770, dated Oct. 5, 1976.

With an arrangement of the above-described type each piston of different shape or size requires its own separate cam. Since cams of this type, that is, cams which are not truly cylindrical, cannot be easily ground on conventional machine tools, they are costly to manufacture. When a family of pistons, each with a slightly different profile, is to be manufactured, the cost of such cams becomes prohibitive.

The present invention provides a simple and economical solution to the problem referred to above by utilizing two separate cams, each of which is capable of being manufactured easily and economically. A truly cylindrical cam of elliptical cross section is utilized to generate the elliptical diameter of the piston and a simple bar or linear cam is used to generate the profile in an axial direction. Linear cams and cams which are truly cylindrical can be manufactured relatively inexpensively. In the machine of the present invention two cams, each with its own cam follower, are employed. The two cam assemblies are operably connected with a single point cutting tool to cause the cutting tool to generate on the surface of a piston a profile which is dictated by the cam surfaces of both cams.

A preferred embodiment of a machine according to the present invention is disclosed in the drawing in which.

Figure 1:
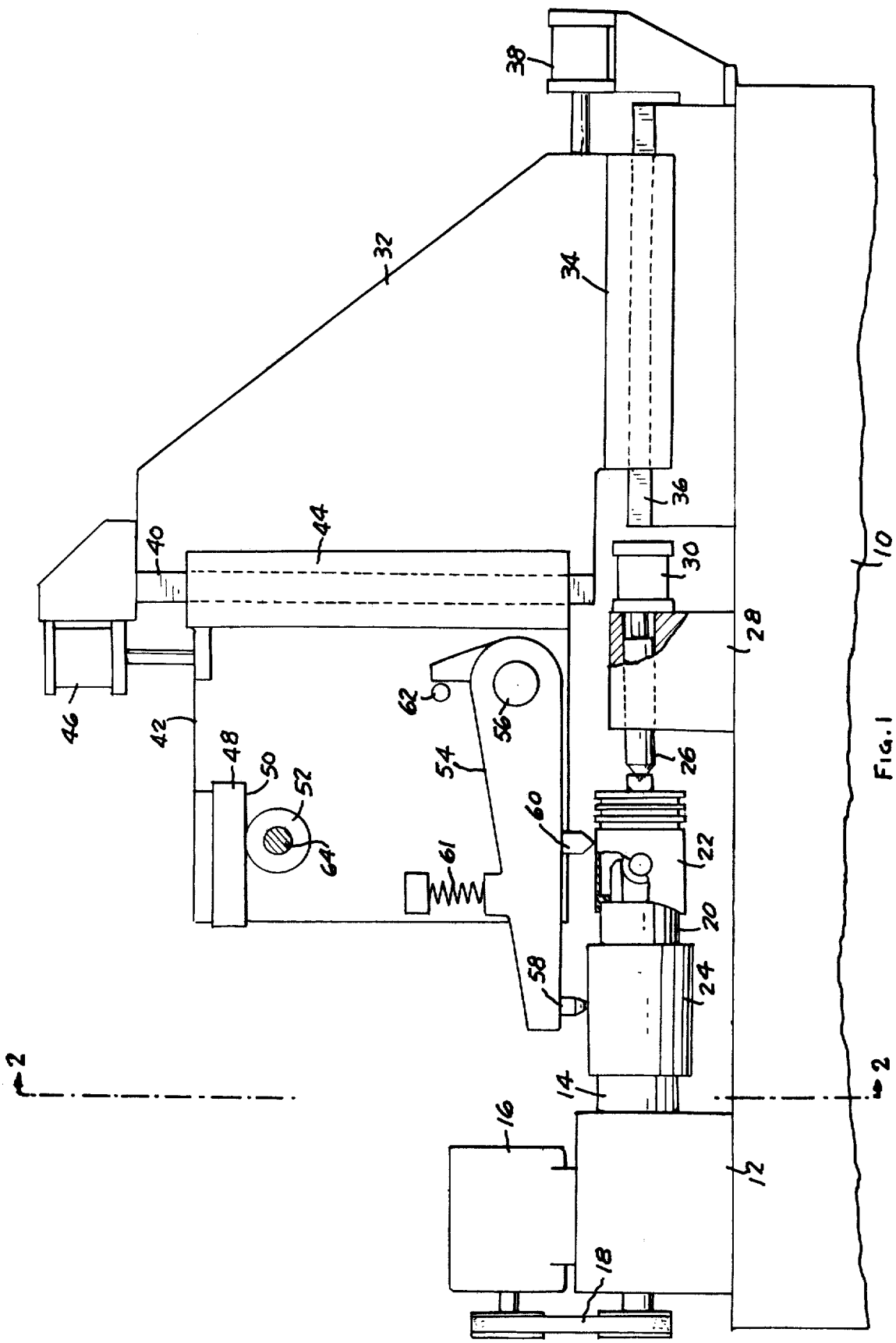
FIG. 1 is a side elevational view, with portions broken away, of a piston turning machine embodying the present invention.

In the drawing, the lathe type machine illustrated has a base 10 on which there is mounted a spindle assembly 12 having a shaft 14 driven for rotation by a motor 16 through a belt 18. Shaft 14 drives a chuck 20 which is adapted to engage and support a piston 22 to be machined. A truly cylindrical cam 24 is supported on either shaft 14 or chuck 20 so that it is coaxial and rotates with piston 22. In radial cross section cam 24 has an elliptical contour which corresponds in shape with the desired elliptical outer contour of piston 22 in radial section.

A tail stock center 26 is supported on base 10 by a block 28 and is urged by a cylinder 30 into engagement with the head end of piston 22 to support it along its axial centerline while the piston is being machined. A horizontal slide 32 has a saddle portion 34 at its lower end which engages ways 36 on base 10 for guiding slide 32 horizontally in a direction parallel to the axis of rotation of piston 22. Slide 22 is moved horizontally by a cylinder 38.

The forward end of slide 32 is formed with vertical ways 40 on which a vertical slide 42 is supported by means of a saddle portion 44. Slide 42 is moved vertically by means of a cylinder 46.

A bar or linear cam 48 is fixedly mounted on slide 42. The lower face 50 of cam 48 has a profile which corresponds to the desired axial profile of the piston in axial section. For example, if the skirt end of the machined piston has a diameter slightly larger than the diameter of the head end of the piston, then, as viewed in FIG. 1, the lower face 50 of cam 48 would incline slightly downwardly and to the right relative to the axis of rotation of piston 22. If desired, cam 48 can be mounted on slide 42 to enable adjustment of the inclination of cam face 50. A cam follower 52 is arranged to engage the lower face 50 of cam 48.

A tool support arm 54 is pivotally supported on vertical slide 42 as at 56. The pivot axis 56 is perpendicular to the axis of rotation of the piston. A cam follower 58 is mounted at the free end of support arm 54 so as to engage the outer surface of cylindrical cam 24. A single point cutting tool 60 is also mounted on support arm 54 intermediate cam follower 58 and the pivot axis 56 so as to engage the surface of the piston to be machined. A spring 61 biases support arm 54 downwardly to maintain the cam follower 58 in contact with the peripheral surface of cam 24. The extent of downward pivoting movement of arm 54 is limited by a stop 62 on slide 42.

Figure 2:
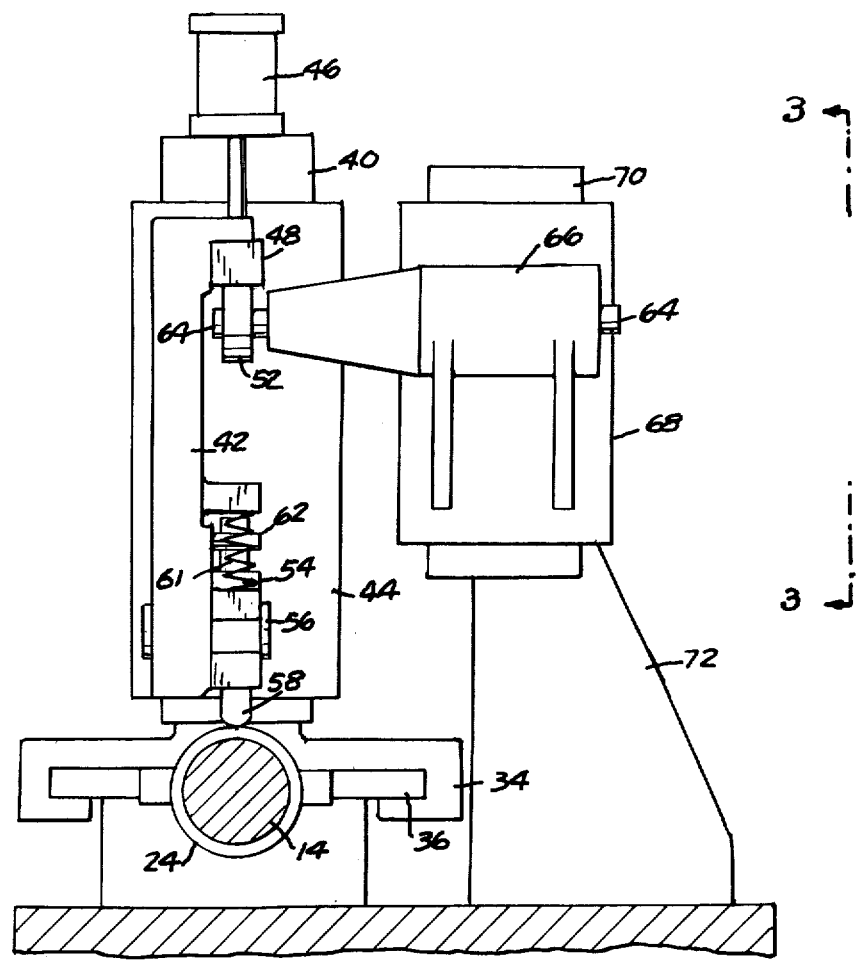
FIG. 2 is a sectional view along the line 2—2 in FIG. 1.
Figure 3:
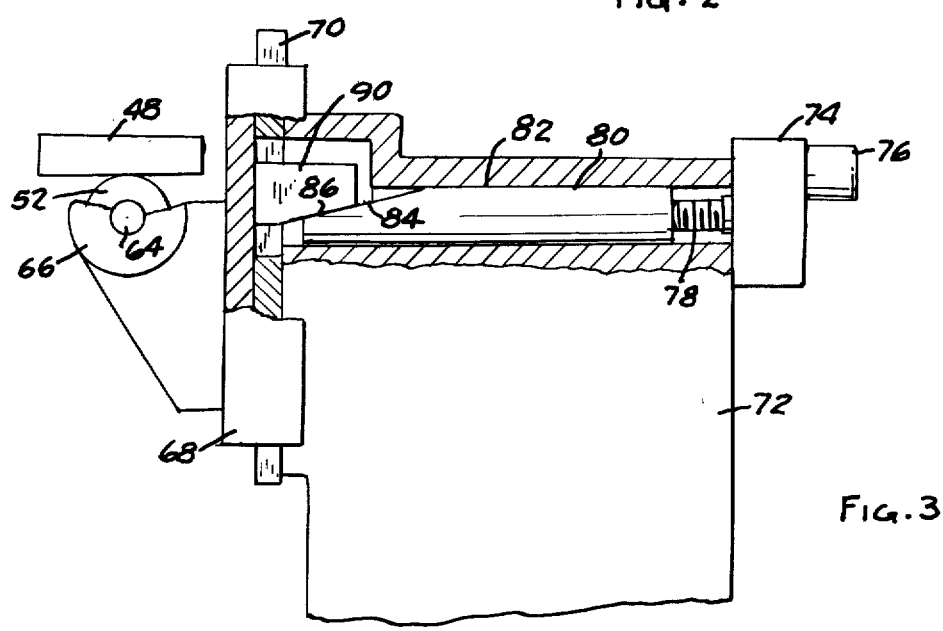
FIG. 3 is a fragmentary view, with portions broken away, taken along the line 3—3 in FIG. 2.

Referring now to FIGS. 2 and 3, the means for supporting cam follower 52 comprises a horizontal shaft 64 which is journalled in a housing 66. Housing 66 is mounted on a vertical slide 68 that is guided for vertical movement by a platen 70 fixedly supported on base 10 by means of a bracket 72. The means for adjusting shaft 64 vertically are illustrated in FIG. 3 and include a large ratio gear reducer 74 mounted on bracket 72 and driven by a motor 76. The output shaft of reducer 74 comprises a fine-pitch screw 78 in threaded engagement with a wedge bar 80 slideably mounted in a bore 82 in bracket 72. The leading end of wedge bar 80 has an angled face 84 in coplanar engagement with a correspondingly angled face 86 of a wedge block 90 fixedly mounted on the inner face of slide 68. It therefore follows that slide 68 is vertically supported on the angled face 84 of wedge bar 80 and will raise and lower slide 42 in response to horizontal movement of wedge bar 80 resulting from the rotation of screw 78 in opposite direction.

In the above described arrangement it will be observed that the vertical slide 42 comprises an output member, the vertical displacement of which is determined by the profile of the face 50 of bar cam 48. Likewise, tool support arm 54 comprises an output member, the pivotal movement of which about axis 56 is determined by the eccentric configuration of the cylindrical cam 24. The pivotal movement of arm 54 about cam follower 58 is determined by the vertical displacement of slide 42. Thus, when cam 44 is rotated and slide 32 is displaced horizontally by cylinder 38, the cutting tool 60 will be displaced radially a distance that is proportional to the algebraic sum of the vertical displacements of slide 42 and cam follower 58. The net result of this movement is that the tool 60 will cut an elliptical surface on piston 22 which corresponds to the elliptical shape of cam 24 and, at the same time, will generate on the surface of the piston in an axial direction the profile of the cam face 50 of cam 48. It will be appreciated that the cam face 50 need not be a perfectly flat face. For example, if a barrel-shaped piston is desired, the cam face 50 of cam 48 will be curved to correspond with the barrel shape desired on the piston.

While the vertical movement of slide 42 during each cycle of operation is controlled by the profile of cam face 50, it will be appreciated that the vertical position of the slide at the beginning or end of any machining cycle can be varied by horizontally displacing wedge bar 80. This displacement will, through cam 48 and follower 52, raise or lower slide 42 and, through arm 54, reposition tool 60 and, thus, change the dimension of the next piston machined. This size change will not alter the profile of the piston generated by either cam and will be used primarily to correct for pistons which are either oversize or undersize. This adjustment is also used where a different sized piston of the same shape is to be machined. It will be understood that, although a motor is shown for moving wedge bar 80, a hand wheel and a graduated dial may be employed for manual operation.

When a machining cycle is completed, cylinder 46 is energized to raise slide 42 and cylinder 38 is energized to retract slide 32. When slide 42 is raised arm 54 pivots counterclockwise until it is engaged by stop 62. Thereafter, arm 54 will move vertically with slide 42 to permit removal of the machined piston from the chuck.

I claim:

1. A machine for turning a non-cylindrical piston of elliptical cross section which comprises, a support, means on said support for rotating a piston about its longitudinal central axis, a cylindrical cam having an elliptical cross section which corresponds in shape with the desired elliptical cross section of the piston, the longitudinal central axis of the cam being parallel to the axis of rotation of the piston, means for rotating the cam about is central axis at the same speed as the piston, a linear cam having a profile corresponding to the desired profile of the outer surface of the piston in axial section, support means for the linear cam, a cam follower adapted to follow the profile of the linear cam, support means for the cam follower, one of said support means being fixedly supported relative to said support and the other being displaceable in a direction parallel to the axis of rotation of the piston, said displaceable support means also being displaceable in a direction perpendicular to the rotating axis of the piston in response to relative movement between the linear cam and the cam follower, a tool holder mounted on the displaceable support means for movement therewith in a direction parallel to the axis of rotation of the piston and for movement thereon toward and away from said axis, a cutting tool on said tool holder adapted to machine the outer surface of the piston when the piston is rotated an the tool is moved axially thereof, a second cam follower mounted on said tool holder in fixed relation to said cutting tool and adapted to follow the contour of the elliptical cam when the latter is rotated and means for moving the displaceable support means in a path parallel to the axis of rotation of the piston whereby, when the piston is rotated and the displaceable support means are displaced in a path parallel to the axis of rotation of the piston, the cutting tool moves axially of the piston to generate thereon the profile of the linear cam and simultaneously moves radially of said axis to generate thereon the elliptical profile of the cylindrical cam.

2. A machine as called for in claim 1 wherein the displaceable support means comprises a first slide mounted on said support for movement in a path parallel to the axis of rotation of the piston and a second slide mounted on the first slide for movement therewith and for movement in a path perpendicular to the axis of rotation of the piston, said tool holder being mounted on the second slide.

3. A machine as called for in claim 1 wherein the cutting tool and the second cam follower are spaced apart on the tool holder such that, when the cam follower is adjacent one end of the cylindrical cam, the cutting tool is positioned adjacent the corresponding end of the piston.

4. A machine as called for in claim 1 wherein the means for rotating the piston includes a chuck on which the cylindrical cam is adapted to be mounted coaxially with the piston.

5. A machine as called for in claim 1 wherein said tool holder comprises a lever pivoted adjacent one end on the displaceable support means and said cutting tool and cam follower are spaced apart lengthwise of the lever.

6. A machine as called for in claim 5 wherein the second cam follower is mounted adjacent the end of the lever remote from its pivot axis and the cutting tool is mounted on the lever intermediate the cam follower and the pivot axis of the lever.

7. A machine as called for in claim 1 wherein said first cam follower is mounted on said fixed support means and the linear cam is mounted on the displaceable support means.

8. A machine as called for in claim 1 including means biasing both cams and cam followers into interengagement.

9. A machine as called for in claim 1 including means for adjusting said fixedly supported means on said support toward and away from the axis of rotation of the piston to vary the diameter of the piston being machined.

10. A machine for turning a non-cylindrical piston of elliptical cross section comprising, means for supporting and rotating a piston about its central longitudinal axis, a cylindrical cam having an elliptical cross section corresponding in shape to the desired elliptical configuration of the piston, means for rotating the cam about its central longitudinal axis in unison with the piston, a cam follower engaging said cam and movable radially thereof in response to rotation of the cam, a first output member movable in proportional relation to the radial movement of said cam follower, a linear cam having a cam profile which corresponds to the desired surface profile of the piston in axial section, a cam follower engaging said linear cam and adapted to produce relative movement therebetween in a direction generally perpendicular to the linear cam profile in response to relative longitudinal movement therebetween, a second output member movable in proportional relative to said relative movement between the linear cam and its cam follower in said perpendicular direction, a cutting tool movable axially of the rotating piston to machine the surface thereof and means operably connecting the cutting tool with said first and second output members to move the tool radially of the piston as it travels axially thereof such that the path generated by the cutting tool corresponds to the algebraic sum of said movements of said first and second output members.

11. A machine as called for in claim 10 wherein said tool is mounted on one of said output members to move therewith and said one output member is movably mounted on the other output member.

12. A machine as called for in claim 10 wherein the cutting tool is mounted on the first output member to move therewith and the first output member is movably mounted on the second output member.

13. A machine as called for in claim 12 wherein the first-mentioned cam follower is mounted on the first output member and the linear cam is mounted on the second output member.

14. A machine as called for in claim 12 wherein the first output member comprises a lever pivotally supported on the second output member.

15. A machine as called for in claim 14 wherein the first-mentioned cam follower is mounted adjacent the end of said lever remote from its pivot axis and the cutting tool is mounted on said lever intermediate the first cam follower and said pivot axis.

* * * * *